July 14, 1942.　　　　　J. O. ALMEN　　　　　2,289,573
V BELT PULLEY

Filed June 14, 1941

Inventor
John O. Almen
By
Blackburn, Sparrow & Hunt
Attorneys

Patented July 14, 1942

2,289,573

UNITED STATES PATENT OFFICE 2,289,573

V BELT PULLEY

John O. Almen, Royal Oak, Mich., assignor to General Motors Corporation, Detroit, Mich., a corporation of Delaware Application June 14, 1941, Serial No. 398,121

5 Claims. (Cl. 74—230.17)

This invention relates to expanding and contracting V belt pulleys of variable effective diameter, such as are used where speed ratio variation is required between a driving shaft and a shaft driven by a belt therefrom.

It relates especially to such V belt pulleys having two coned sides movable relatively to each other coaxially of the shaft on which they are mounted, with spring means resiliently urging said sides towards each other to increase the effective diameter of the pulley.

The object of the invention is a V belt pulley of simple and compact design, of the kind in which the two sides of the pulley move equally in opposite directions so that the belt therebetween always remains in the same plane.

Another object of the invention is a V belt pulley in which simple pivotal or rocking bearings replace the sliding bearings usually required between the relatively movable parts.

The above and other objects of the invention will be apparent as the description proceeds.

According to the invention, the movable pulley sides are provided with slots on their outer peripheries and with mutually interlacing fingers on their inner peripheries. The inner peripheries are spaced away from sliding contact on their supporting shaft and the pulley sides are supported concentrically of the shaft, between two axially spaced annular disc springs having slots in their inner peripheries, and lugs on their outer peripheries, which respectively engage the fingers on the inner periphery of one pulley side and the slots in the outer periphery of the other pulley side; the said disc springs being rockingly supported at their mid-section on driving members which are secured to the shaft.

The drawing shows the construction of an expanding and contracting V belt pulley according to the invention.

In the drawing

The pulley has two coned sides 1 and 2, two annular disc springs 3 and 4, and two driving members 5 and 6. The pulley sides, the disc springs, and the driving members are respectively identical stampings.

Figure 1:
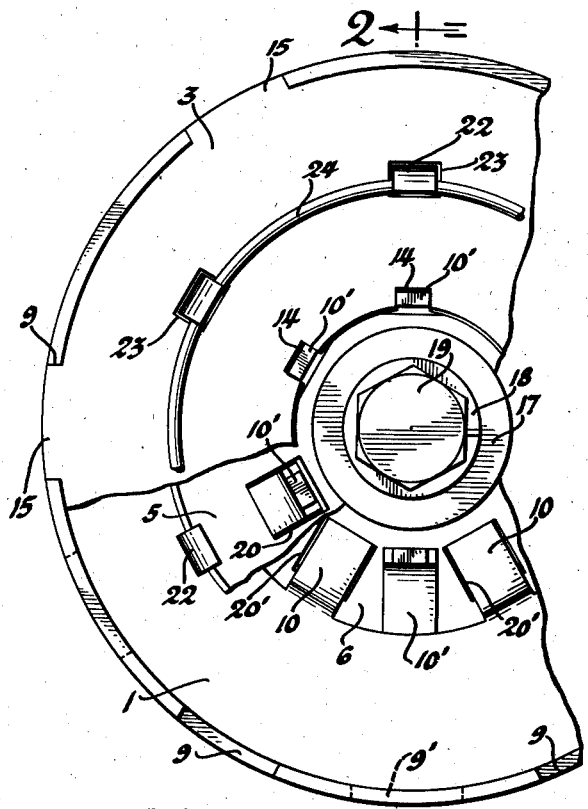
Figure 1 shows an elevational view of the pulley with part broken away.
Figure 2:
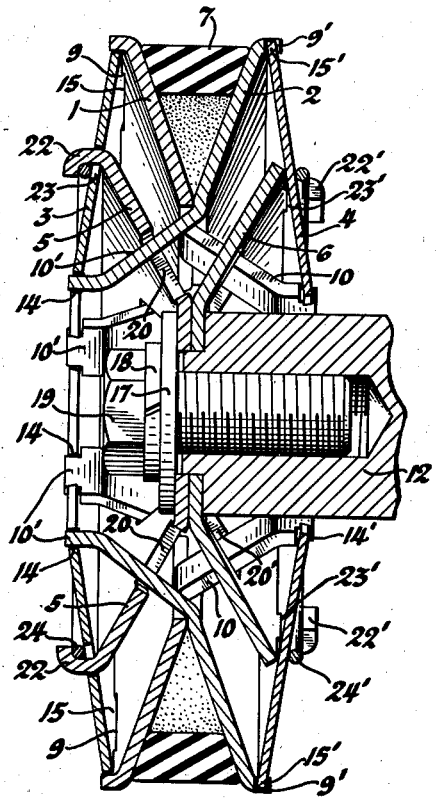
Figure 2 is a sectional view on line 2—2 of Figure 1 showing the parts in the position of maximum pulley diameter.
Figure 3:
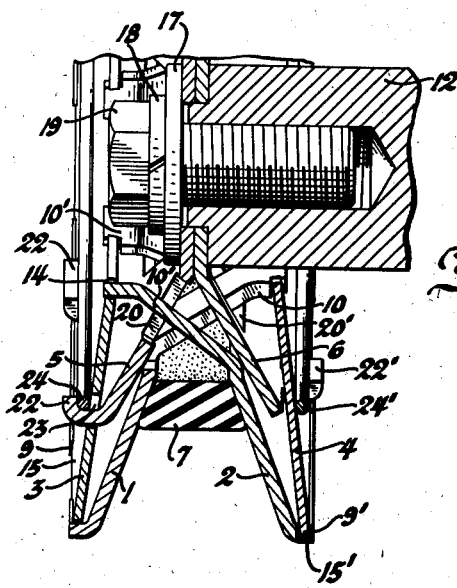
Figure 3 is a sectional view of a part of the pulley, similar to Figure 2, but showing the parts in the position of minimum pulley diameter.

The disc springs tend to maintain the pulley sides in the position of maximum effective pulley diameter shown in Figure 2, but the pulley sides can be spread apart by the V belt 7 to the minimum effective diameter shown in Figure 3.

The outer peripheries of the pulley sides are respectively provided with slots 9, 9' and their inner peripheries are provided with mutually interlacing fingers 10, 10'.

The inner peripheries of the pulley sides are spaced away from sliding contact on their supporting shaft 12, and are supported concentrically of the shaft, between the two axially spaced disc springs 3 and 4, having slots 14, 14', and lugs 15, 15', respectively, in their inner and outer peripheries. The slots 14 and 15 of the disc spring 3, respectively engage the fingers 10' on the inner periphery of the pulley side 2 and the slots 9 on the outer periphery of the other pulley side 1; the slots 14' and lugs 15' of the disc spring 4 respectively engaging the fingers 10 on the inner periphery of the pulley side 1 and the slots 9' on the outer periphery of the other pulley side 2.

The disc springs 3 and 4 are themselves supported on the driving members 5 and 6, which are keyed to the shaft 12, and clamped between a shoulder thereon and washers 17 and 18, by a bolt 19.

There are openings 20, 20' in the driving members 5 and 6 respectively, through which the fingers 10' and 10 of the respective pulley sides extend, and the outer peripheries of the driving members are provided with lugs 22, 22' which extend through openings 23, 23', in the mid-section of the disc springs with which they are in supporting and driving engagement. The ends of the lugs 22, 22' of the driving members 5 and 6 are curved, as shown, to accommodate snap rings 24, 24' which retain the disc springs and the pulley sides in assembled relationship with the driving members, and function as rocking pivots for the disc springs.

It will be seen that the pulley is formed of identical halves which move equally in opposite directions relatively to one another, so that there is no change in the position of the median plane of the pulley axially of the shaft 12, or of the belt 7, upon expansion or contraction in the effective diameter of the pulley.

The disc springs are coned in the direction shown in Figure 2, but in their range of operation they are flexed through a position in which they are flat to a condition in which the pulley has the minimum effective diameter shown in Figure 3, in which they are coned in an opposite direction. Throughout this range of operation the mid-sections of the springs merely rock about their respective fixed fulcrums provided by the snap rings 24 and 24' and the pulley sides move relatively to each other, while being at all times properly supported by the disc springs which are themselves supported by the driving members.

I claim:

1. A shaft, an expanding and contracting V belt pulley thereon having two coned sides movable relatively to each other axially of the shaft, to vary the effective diameter of the pulley, and disc spring means resiliently urging said sides towards each other and tending to increase the effective diameter of the pulley; said pulley sides being supported by said disc spring means which are connected to the shaft for rotation therewith.

2. The combination according to claim 1, in which there are identical disc spring means for each of the pulley sides, whereby upon any change in the effective diameter of the pulley, the pulley sides move equally in opposite directions, without change in the position of the median plane of the pulley, axially of the shaft.

3. The combination according to claim 1, in which the movable pulley sides are radially spaced away from sliding contact on the shaft and are supported concentrically of the shaft, between two axially spaced disc springs each having slots and lugs in their inner and outer peripheries respectively which engage fingers on the inner periphery of one pulley side and slots on the outer periphery of the other pulley side, the said disc springs being rockingly supported at their mid-section on driving members which are secured to the shaft.

4. A shaft, an expanding and contracting V belt pulley thereon having two coned sides movable relatively to each other axially of the shaft, to vary the effective diameter of the pulley, and disc spring means resiliently urging said sides towards each other and tending to increase the effective diameter of the pulley; said pulley sides being supported by said disc spring means which are supported in driving members secured to said shaft.

5. The combination according to claim 1, in which the pulley sides have interlacing fingers at their inner peripheries, which extend through slots in driving members, said driving members having lugs which extend through openings in the mid-section of the disc springs to engage snap rings which hold the disc springs and pulley sides in assembled relationship with the driving members and function as rocking pivots for the disc springs the inner and outer peripheries of which respectively engage the fingers at the inner periphery of one pulley side and the outer periphery of the other pulley side.

JOHN O. ALMEN.